(12) United States Patent
Seto

(10) Patent No.: US 7,366,802 B2
(45) Date of Patent: Apr. 29, 2008

(54) METHOD IN A FRAME BASED SYSTEM FOR RESERVING A PLURALITY OF BUFFERS BASED ON A SELECTED COMMUNICATION PROTOCOL

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 10/977,181

(22) Filed: Oct. 29, 2004

(65) Prior Publication Data

US 2006/0095608 A1 May 4, 2006

(51) Int. Cl.
G06F 13/36 (2006.01)
G06F 5/00 (2006.01)
H04L 1/00 (2006.01)

(52) U.S. Cl. .................. 710/52; 710/29; 710/62; 710/310; 370/360; 370/412; 370/474

(58) Field of Classification Search .................. 710/52, 710/62, 29, 310; 370/474, 412, 360
See application file for complete search history.

(56) References Cited

U.S. PATENT DOCUMENTS

| | | | |
|---|---|---|---|
| 5,473,604 A | 12/1995 | Lorenz et al. | |
| 5,691,985 A | 11/1997 | Lorenz et al. | |
| 5,732,286 A | 3/1998 | Leger | |
| 5,995,486 A | 11/1999 | Iliadis | |
| 6,249,756 B1 | 6/2001 | Bunton et al. | |
| 6,252,851 B1 | 6/2001 | Siu et al. | |
| 6,490,271 B1 | 12/2002 | Erjanne | |
| 6,687,254 B1 * | 2/2004 | Ho et al. | 370/412 |
| 2002/0159480 A1 | 10/2002 | Sekihata et al. | |
| 2003/0074515 A1 | 4/2003 | Resnick | |
| 2004/0100977 A1 | 5/2004 | Suzuki et al. | |
| 2004/0202155 A1 * | 10/2004 | Natarajan et al. | 370/360 |
| 2004/0252716 A1 | 12/2004 | Nemazie | |
| 2005/0094668 A1 * | 5/2005 | Hanif et al. | 370/474 |
| 2005/0223140 A1 | 10/2005 | Seto et al. | |
| 2005/0223141 A1 | 10/2005 | Seto et al. | |
| 2005/0233140 A1 | 10/2005 | Oh et al. | |

OTHER PUBLICATIONS

"PCI Express Base Specification Revision 1.0", PCI Express (Jul. 22, 2002) 429 pgs.
"PCI-X Addendum to the PCI Local Bus Specification", PCI Special Interest Group: Revision 1.0a, (Jul. 24, 2000) 240 pgs.
"Serial ATA: High Speed Serialized AT Attachment, Serial ATA Workgroup", APT Technologies, Inc.: Revision 1.0a, (Jan. 7, 2003) 311 pgs.

(Continued)

*Primary Examiner*—Tammara Peyton
(74) *Attorney, Agent, or Firm*—Grossman, Tucker, Perreault & Pfleger, PLLC

(57) ABSTRACT

A method according to one embodiment may include reserving a plurality of buffers having an aggregate capacity, receiving a frame having a size less than the aggregate capacity, and releasing at least one of the plurality of buffers that is unused to store the frame. Of course, many alternatives, variations, and modifications are possible without departing from this embodiment.

19 Claims, 6 Drawing Sheets

OTHER PUBLICATIONS

"ATM User-Network Interface (UNI) Signaling Specification", The ATM Forum Technical Committee, Version 4.1 af-sig-0061.001, (Apr. 2002) 157 pgs.

"Serial ATA II: Extensions to Serial ATA 1.0a", Revision 1.2, (Aug. 27, 2004), 110 pgs.

"American National Standard", Working Draft Serial Attached SCSI—1.1 (SAS-1.1), Revision 6,(Oct. 2, 2004),534 pgs.

Satran, J. et al., "Internet Small Computer Systems Interface (iSCSI)", Network Working Group, Request for Comments: 3720, Category: Standards Track, (Apr. 2004),200 pgs.

"INCITS working draft proposed American National Standard for Information Technology", Fibre Channel—Framing and Signaling-2 (FC-FS-2) Rev 0.30, (Sep. 7, 2004),442 pgs.

"Working Draft American National Standard, Project T10/1601-D", Information Technology- Serial Attached SCSI- 1.1 (SAS-1.1): Revision 1, (Sep. 18, 2003), 464 pgs.

Office Action dated Dec. 20, 2006 for U.S. Appl. No. 10/815,271.

Final Office action dated Jun. 4, 2007 for U.S. Appl. No. 10/815,271.

Office Action dated Nov. 14, 2006 for U.S. Appl. No. 10/815,909.

Notice of allowance dated Jun. 27, 2007 for U.S. Appl. No. 10/815,909.

* cited by examiner

US 7,366,802 B2

METHOD IN A FRAME BASED SYSTEM FOR RESERVING A PLURALITY OF BUFFERS BASED ON A SELECTED COMMUNICATION PROTOCOL

FIELD

This disclosure relates to buffer utilization in a frame based communication system.

BACKGROUND

A conventional communication system may include one device capable of bidirectional communication with another device. One device may include a computer node having a host bus adapter (HBA). The other device may be a mass storage device. A variety of intermediate devices such as expanders, bridges, routers, and switches may also be utilized in the system to facilitate coupling and communication between a plurality of HBAs and mass storage devices. The HBA and mass storage device may each function as a transmitting and receiving device in order to exchange data and/or commands with each other using one or more of a variety of communication protocols.

A protocol engine may be utilized to facilitate such communication. The protocol engine of frame based communication protocols may also facilitate parsing of the data and/or commands into frames of varying sizes for efficient routing and reassembling of such frames at the receiving device. Such frames may include relatively smaller sized frames that may include command, control, or status information and, in comparison, larger sized frames for exchanging data payload. In some instance, smaller sized frames may also include relatively smaller amounts of data payload. The protocol engine may utilize a transceiver buffer to assist with transmission and receipt of such frames. In a conventional embodiment, one buffer may be sized to accommodate at least the maximum frame size for a particular communication protocol. However, this buffer size is inefficient for smaller sized frames as it can result in significant wasted space in the buffer. In addition, this may also contribute to increased input/output (IO) latency as the protocol engine needs to complete frame processing before making the wasted buffer space of the buffer available for other uses such as for the receipt of additional frames.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
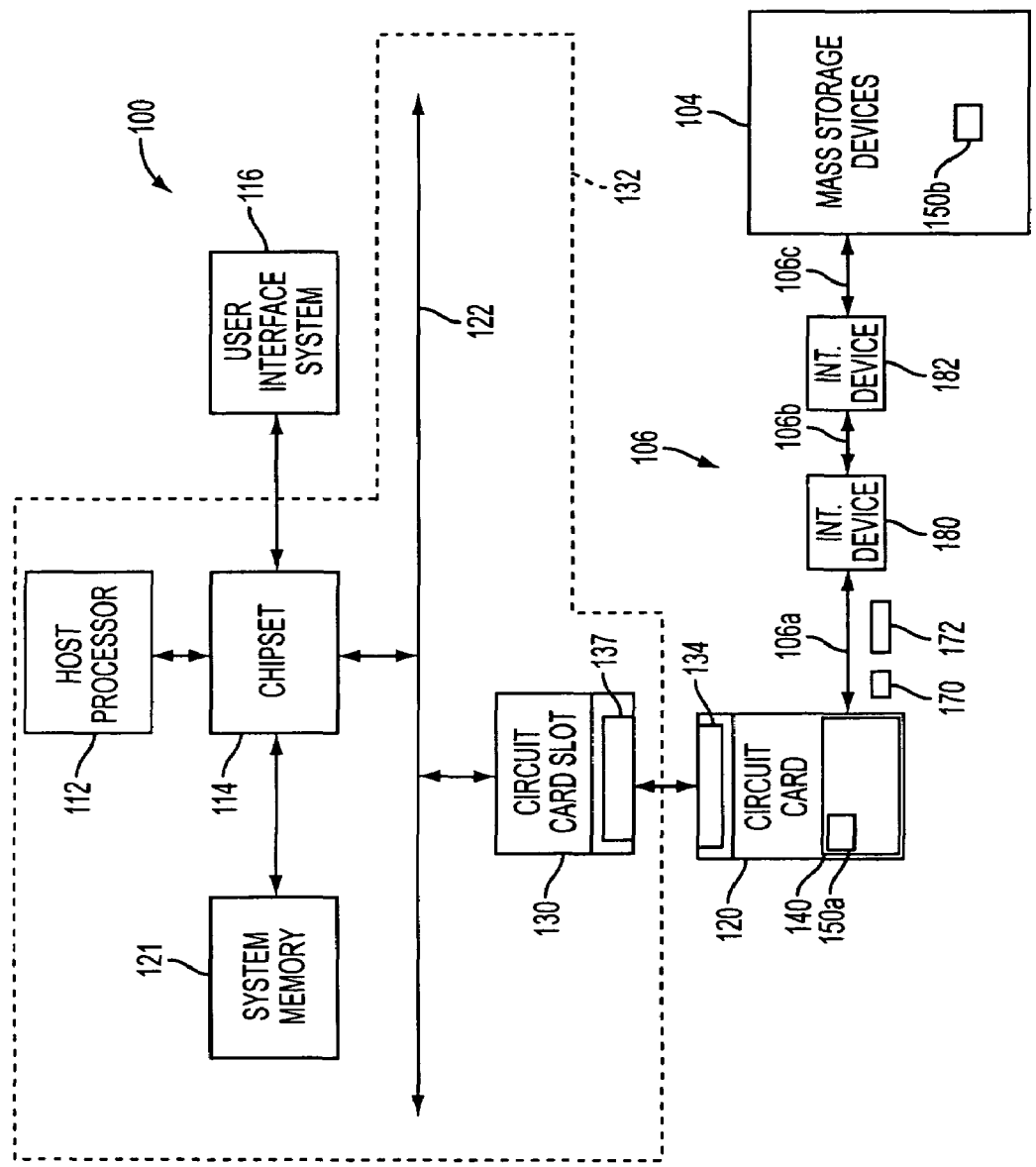
FIG. 1 is a diagram illustrating a system embodiment.

FIG. 1 illustrates a system embodiment 100 of the claimed subject matter. The system 100 may include a computer node having a host bus adapter (HBA), e.g., circuit card 120. The circuit card 120 is capable of bidirectional communication with mass storage 104 via one or more communication links 106 using one or more communication protocols. The communication links 106 may include any variety and plurality of intermediate devices 180, 182 such as expanders, bridges, routers, and switches and associated links 106a, 106b, 106c coupling the intermediate devices to the circuit card 120 and mass storage 104. Mass storage 104 may include one or more mass storage devices, e.g., one or more redundant array of independent disks (RAID) and/or peripheral devices.

Such communication between the HBA and mass storage 104 may take place by transmission of one or more frames. As used herein in any embodiment, a "frame" may comprise one or more symbols and/or values. Both the HBA 120 and mass storage 104 may act as a receiving device that receives data and/or commands from the other. Each of the HBA 120 and mass storage 104 may have protocol engine circuitry 150a, 150b to facilitate such communication. As used herein, "circuitry" may comprise, for example, singly or in any combination, hardwired circuitry, programmable circuitry, state machine circuitry, and/or firmware that stores instructions executed by programmable circuitry.

The system 100 may also generally include a host processor 112, a bus 122, a user interface system 116, a chipset 114, system memory 121, a circuit card slot 130, and a circuit card 120 capable of communicating with mass storage 104. The host processor 112 may include one or more processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may alternatively comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface system 116 may include one or more devices for a human user to input commands and/or data and/or to monitor the system 100 such as, for example, a keyboard, pointing device, and/or video display. The chipset 114 may include a host bridge/hub system (not shown) that couples the processor 112, system memory 121, and user interface system 116 to each other and to the bus 122. The chipset 114 may include one or more integrated circuit chips, such as those selected from integrated circuit chipsets commercially available from the Assignee of the subject application (e.g., graphics memory and I/O controller hub chipsets), although other integrated circuit chips may also, or alternatively be used. The processor 112, system memory 121, chipset 114, bus 122, and circuit card slot 130 may be on one circuit board 132 such as a system motherboard.

The circuit card 120 may be constructed to permit it to be inserted into the circuit card slot 130. When the circuit card 120 is properly inserted into the slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114.

Alternatively, without departing from this embodiment, the operative circuitry of the circuit card 120 may be included in other structures, systems, and/or devices. These other structures, systems, and/or devices may be, for example, in the motherboard 132, and coupled to the bus 122. These other structures, systems, and/or devices may also be, for example, comprised in chipset 114.

The circuit card 120 may communicate with mass storage 104 via one or more communication links 106 using one or more communication protocols. Exemplary communication protocols may include, but are not limited to, Fibre Channel (FC), Serial Advanced Technology Attachment (S-ATA), Serial Attached Small Computer Systems Interface (SAS) protocol, Internet Small Computer System Interface (iSCSI), and/or asynchronous transfer mode (ATM).

If a FC protocol is used, it may comply or be compatible with the interface/protocol described in ANSI Standard Fibre Channel Framing and Signaling Specification, 2 Rev 0.3 T11/1619-D, dated Sep. 7, 2004. Alternatively, if a S-ATA protocol is used, it may comply or be compatible with the protocol described in "Serial ATA: High Speed Serialized AT Attachment," Revision 1.0a, published on Jan. 7, 2003 by the Serial ATA Working Group, and the Extension to SATA, 1.0a Rev 1.2, dated Aug. 27, 2004. Further alternatively, if a SAS protocol is used, it may comply or be compatible with the protocol described in "Information Technology-Serial Attached SCSI-1.1 (SAS)," Working Draft American National Standard of International Committee For Information Technology Standards (INCITS) T10 Technical Committee, Project T10/1562-D, Revision 6, published Oct. 2, 2004, by American National Standards Institute (hereinafter termed the "SAS Standard") and/or later-published versions of the SAS Standard. Further alternatively, if an iSCSI protocol is used, it may comply or be compatible with the protocol described in "IP Storage Working Group, Internet Draft, draft-itef-ips-iscsi-21.txt", published Apr. 29, 2004 by the Internet Engineering Task Force (IETF) and/or later published versions of the same. Further alternatively, if an ATM protocol is used, it may comply or be compatible with the plurality of ATM Standards approved by the ATM Forum including, for example, "ATM User-Network Interface (UNI) Signaling Specification" published April 2002 by the ATM Forum.

To accomplish such communication, the circuit card 120 may have protocol engine circuitry 150a. The protocol engine circuitry 150a may exchange data and commands with mass storage 104 by transmission and reception of one or more frames, e.g., smaller sized frame 170 and larger sized frame 172. A large number of frames of varying sizes from many different devices such as mass storage devices and HBAs may be transmitted via communication links 106. The protocol engine circuitry 150a may be included in an integrated circuit (IC) 140. As used herein, an "integrated circuit" or IC means a semiconductor device and/or microelectronic device, such as, for example, a semiconductor integrated circuit chip. There may also be intermediate devices 180, 182, including, but not limited to, expanders, bridges, routers, and switches, that may also have an integrated circuit and circuitry consistent with protocol engine circuitry 150a, 150b.

The IC 140 may also support communication using multiple communication protocols. For example, the IC 140 may be able to examine characteristics of a received frame or signal sequence to determine if the received frame is compliant with a particular communication protocol, e.g., SAS, FC, or S-ATA. The IC 140 may then utilize particular circuitry compliant with the appropriate communication protocol. As such, the IC 140 may be able to communicate with various devices using a plurality of communication protocols.

Figure 2:
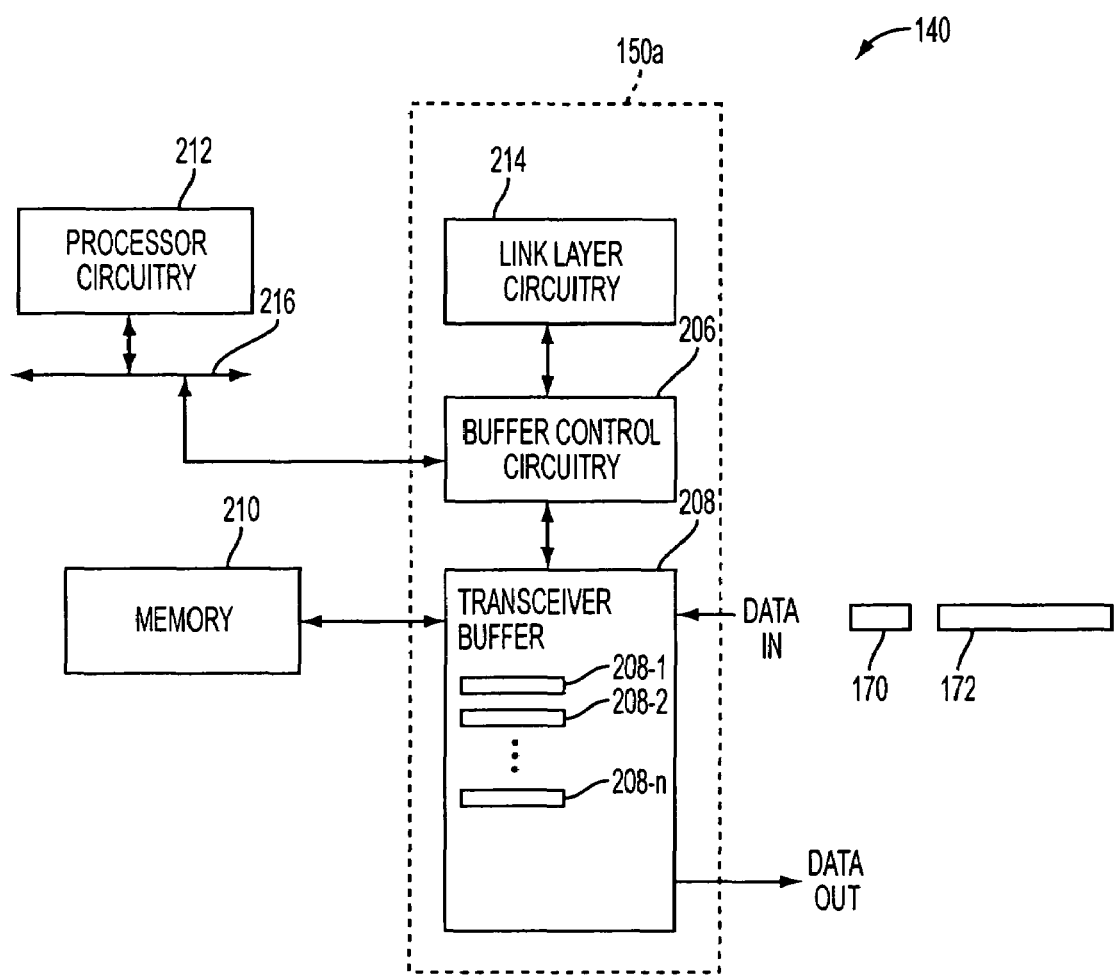
FIG. 2 is a diagram illustrating in greater detail an integrated circuit in the system embodiment of FIG. 1 including a transceiver buffer having a plurality of buffers consistent with an embodiment.

FIG. 2 illustrates portions of the integrated circuit 140, including protocol engine circuitry 150a, processor circuitry 212, processor bus 216, and memory 210. The protocol engine circuitry 150a may include a transceiver buffer 208, buffer control circuitry 206, and link layer circuitry 214. The protocol engine circuitry 150a may also include other circuitry such as data transport layer circuitry, port layer circuitry, and PHY layer circuitry (not illustrated) to further facilitate communication using the appropriate protocol. The transceiver buffer 208 may include a plurality of buffers 208-1, 208-2 . . . 208-n. The buffer control circuitry 206 may control storage of data in and retrieval of data from, the plurality of buffers 208-1, 208-2 . . . 208-n as well as monitor which of those buffers are available or free for use in conjunction with transmission and/or reception of frames.

Processor circuitry 212 may include processor core circuitry that may comprise a plurality of processor cores. As used herein, a "processor core" may comprise hardwired circuitry, programmable circuitry, and/or state machine circuitry. Machine readable program instructions may be stored in any variety of machine readable media, e.g., the processor core may have a set of micro-code program instructions that may be executed by the processor circuitry 212, such that when such instructions are executed by the processor circuitry 212 it may result in the processor circuitry 212 performing operations described herein. In addition, such program instructions, e.g., machine-readable firmware program instructions, may be stored in other memory locals that may be accessed and executed by the integrated circuit 140 to perform operations described herein as being performed by the integrated circuit.

Processor bus 216 may allow exchange of data and/or commands between at least the processor circuitry 212 and the buffer control circuitry 206. Additional components (not illustrated) may also be coupled to the processor bus 216. The integrated circuit 140 may also include additional components (not illustrated) such as bridge circuitry to bridge the processor bus 216 with an I/O bus. Host interface circuitry (not illustrated) may couple the I/O bus with the bus 122 of the system of FIG. 1 when the circuit card 120 is coupled to the circuit card slot 130.

Data received by the IC 140 may be temporarily stored in the transceiver buffer 208 and then output to memory 210. Data transmitted by the IC 140 may be provided by a number of sources, such as memory 210, to the transceiver buffer 208 where it may be temporarily stored before being transmitted to a receiving node. The memory 210 may include one or more machine readable storage media such as random-access memory (RAM), dynamic RAM (DRAM), static RAM (SRAM) magnetic disk (e.g. floppy disk and hard drive) memory, optical disk (e.g. CD-ROM) memory, and/or any other device that can store information.

The transceiver buffer 208 may include a plurality of buffers 208-1, 208-2 . . . 208-n controlled by the buffer control circuitry 206. Each of the plurality of buffers 208-1, 208-2 . . . 208-n may have a predetermined size. The predetermined size may less than the maximum sized frame supported by a particular communication protocol. In one embodiment, the predetermined size may be less than or equal to 512 bytes such that most control frames (most control frames may have a size less than or equal to 256 bytes) may be held in only one of the plurality of buffers 208-1, 208-2 . . . 208-n. For example, if the buffer 208-1 has a size of 512 bytes and a smaller sized frame of 256 bytes is temporarily stored in that buffer, only the remaining 256 bytes of space in that buffer 208-1 would not be utilized. Therefore, this would reduce the amount of unused or wasted space that would occur as opposed to a conventional embodiment that utilizes a buffer size large enough to accommodate the maximum sized frame, e.g, a 2,112 byte sized buffer to accommodate a maximum sized FC compliant frame. In addition, given the relatively smaller size of the buffers 208-1, 208-2 . . . 208-n, a plurality of two or more of the buffers may be required to store a larger sized frame.

Figure 3:
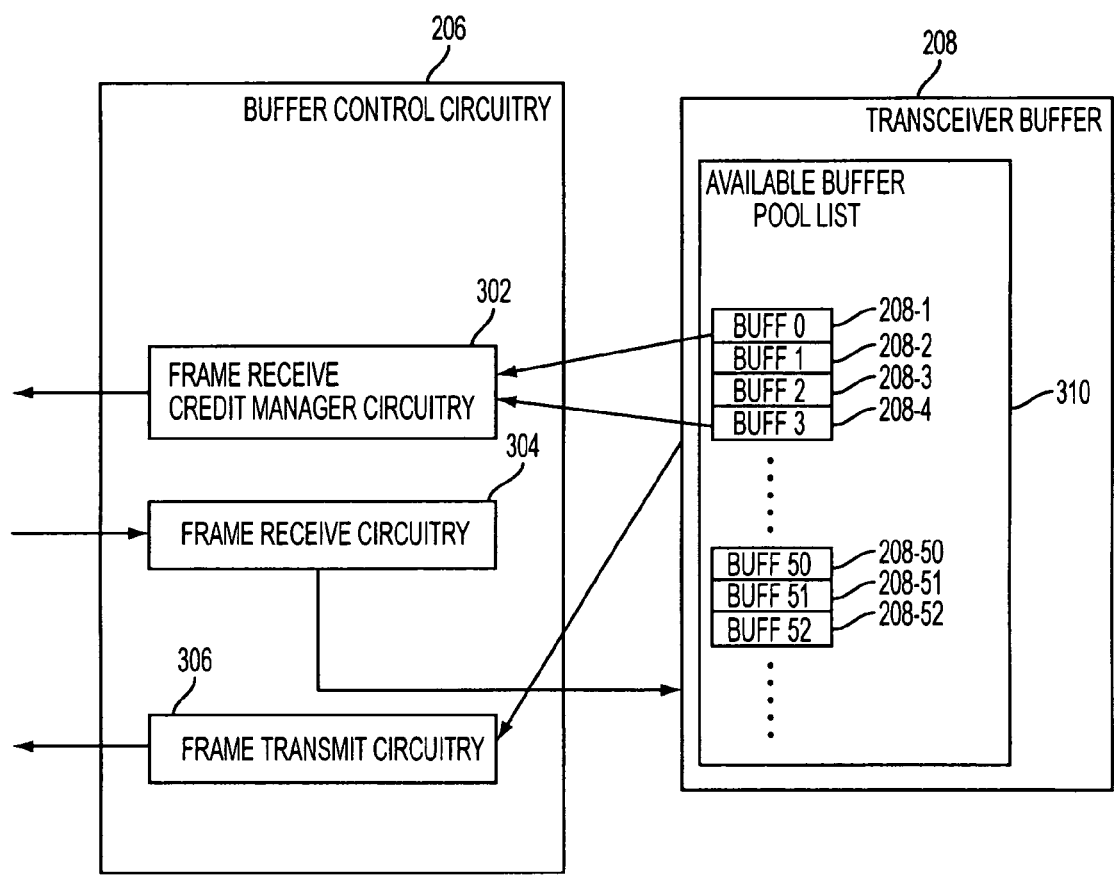
FIG. 3 is a diagram illustrating in greater detail the buffer control circuitry of FIG. 2 in conjunction with the plurality of buffers of the transceiver buffer.

FIG. 3 illustrates the buffer control circuitry 206 of FIG. 2 in more detail. The buffer control circuitry 206 may include frame receive credit manager circuitry 302, frame receive circuitry 304, and frame transmit circuitry 306. The buffer control circuitry 206 may also maintain an available buffer pool list 310 of those buffers of the transceiver buffer 208, e.g., buffers 208-1, 208-2, 208-3, 208-4, 208-50, 208-51, and 208-52 that are available or free for use.

In preparation for frame reception, the frame receive credit manager circuitry 302 may reserve a predetermined number of the plurality of available buffers from the available buffer pool 310. The frame receive credit manager circuitry 302 may also send a receive credit to a transmitting node when such buffers are reserved. Communications protocols such as SAS and FC may require the sending of such receive credits. The predetermined number of buffers may have an aggregate capacity large enough to store a received frame having a maximum frame size defined by the protocol since it may not be known how large the received frame will be when the receive credit is sent. For example, the predetermined plurality of buffers may be four buffers in the embodiment of FIG. 3 such that the receive credit manager circuitry 302 may send a receive credit when buffers 208-1, 208-2, 208-3, and 208-4 are available.

The frame receive circuitry 304 may then control receipt of the actual received frame. The actual received frame may have a size less than the expected maximum length size and may require less than aggregate capacity of the plurality of buffers that were reserved to store such frame. The frame receive circuitry 304 may then immediately release at least one of the reserved plurality of buffers that is unused to store the inbound frame back to the available buffer pool 310 of the transceiver buffer 208. The frame receive circuitry 304 may release one or more of the unused buffers immediately upon receipt of the actual inbound frame, e.g., upon receipt of an end-of-frame primitive indicating the end of the frame, and during processing of the actual inbound frame.

Hence, the space in the released buffer(s) may be made available quickly without waiting for complete frame processing of the inbound frame thus improving latency caused by locking up wasted storage space in a buffer during frame processing. The released buffer(s) may be released back to the available buffer pool 310 of the transceiver buffer 208 so that they be utilized for some other purpose, e.g., transmit or receipt of additional frames. For example, the frame receive credit manager circuitry 302 may have reserved four buffers 208-1, 208-2, 208-3, and 208-4 before sending a receive credit. The actual received frame may be a smaller sized frame such as a control frame that could be stored in its entirety in one buffer 208-1. The frame receive circuitry 304 would then immediately release three buffers 208-2, 208-3, and 208-4 back to the available buffer pool 310.

During frame transmission, the frame transmit circuitry 306 may utilize a minimum number of the plurality of buffers 208-1, 208-2 . . . 208-n necessary to store an entirety of an outbound frame. For example, if the outbound frame is 500 bytes and the size of each of the plurality of buffers 208-1, 208-2 . . . 208-n is 512 bytes, then only one buffer would be necessary to hold the outbound frame and there would minimal wasted of only 12 bytes in the buffer. If the outbound frame is 1,000 bytes for the same sized (512 byte) buffers, then the frame transmit circuitry 306 may utilize two buffers to hold the outbound frame. Again, the frame transmit circuitry 306 may utilize only as many of the available buffers from the available buffer pool 310 that are necessary to hold the outbound frame. This avoids excess waste of buffer memory space that may occur in a conventional embodiment that utilizes a larger sized buffer to hold a smaller sized outbound frame.

Figure 4:
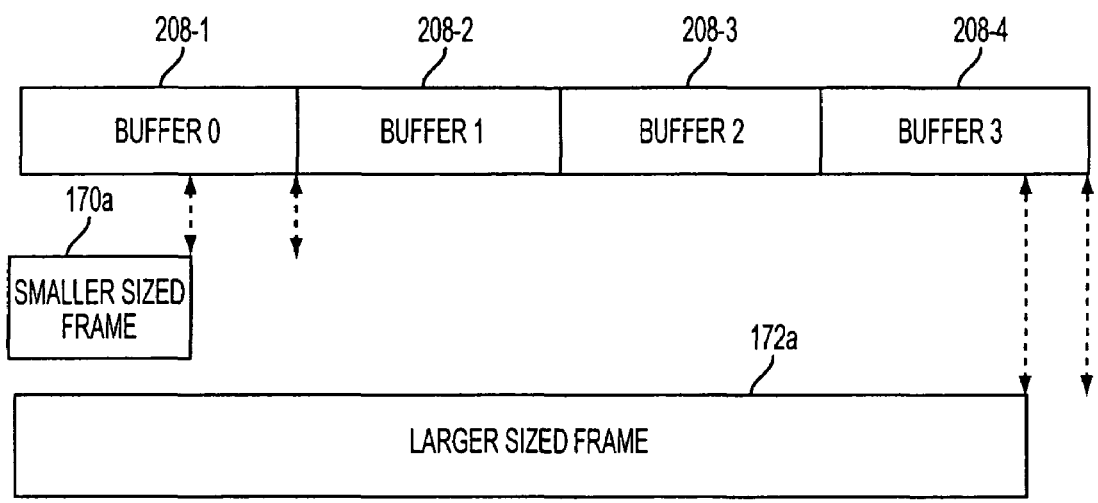
FIG. 4 is a block diagram illustrating an example of a relative size of the plurality of buffers compared to smaller and larger sized frames.

FIG. 4 illustrates one embodiment illustrating the relative size of four buffers 208-1, 208-2, 208-3, and 208-4 compared to a smaller sized frame 170a and larger sized frame 172a. The smaller sized frame 170a may be a command, control, or status frame including such command, control, and status information. The smaller sized frame 170a may also be a data payload type frame containing a relatively small amount of payload data compared to the maximum amount of payload data that may be held in one frame.

The larger sized frame 172a may be a maximum sized frame for a particular communication protocol containing a relatively larger amount of payload data. The buffers 208-1, 208-2, 208-3, and 208-4 may be of a size that requires a plurality of them, e.g., the four buffers 208-1, 208-2, 208-3, and 208-4, to store the larger sized frame 172a. Furthermore, it may only take one of such buffers, e.g., buffer 208-1, to store the smaller sized frame 170a. In one of many embodiments, each buffer 208-1, 208-2, 208-3, and 208-4 may have a size equal to or less than 512 bytes. In another embodiment, each buffer 208-1, 208-2, 208-3, and 208-4 may have a size equal to or less than 256 bytes. Other sized buffers larger than 512 bytes may also be utilized.

For those communication protocols that send receive credits before reception of frames such as SAS and FC, a receive credit may be sent if four buffers 208-1, 208-2, 208-3, and 208-4 are available, e.g., as listed in the available buffer pool list 310. If the smaller sized frame 170a is received and stored in buffer 208-1, buffers 208-2, 208-3, and 208-4 may be released back to the available buffer pool immediately upon receipt of the smaller sized frame 170a. If the larger sized frame 172a is received, all four buffers would be needed to store the frame and none of the buffers 208-1, 208-2, 208-3, or 208-4 would be released.

For transmission of the smaller sized frame 170a, the minimum number of buffers necessary to hold the outbound smaller sized frame 170a would only be one buffer, e.g., buffer 208-1. For transmission of the larger sized frame 172a, four buffers, e.g., buffers 208-1, 208-2, 208-3, and 208-4, would be necessary to hold the outbound frame 172a. Again therefore, only as many of the available buffers from the available buffer pool list that are necessary to hold an entirety of the outbound frame are utilized.

Figure 5:
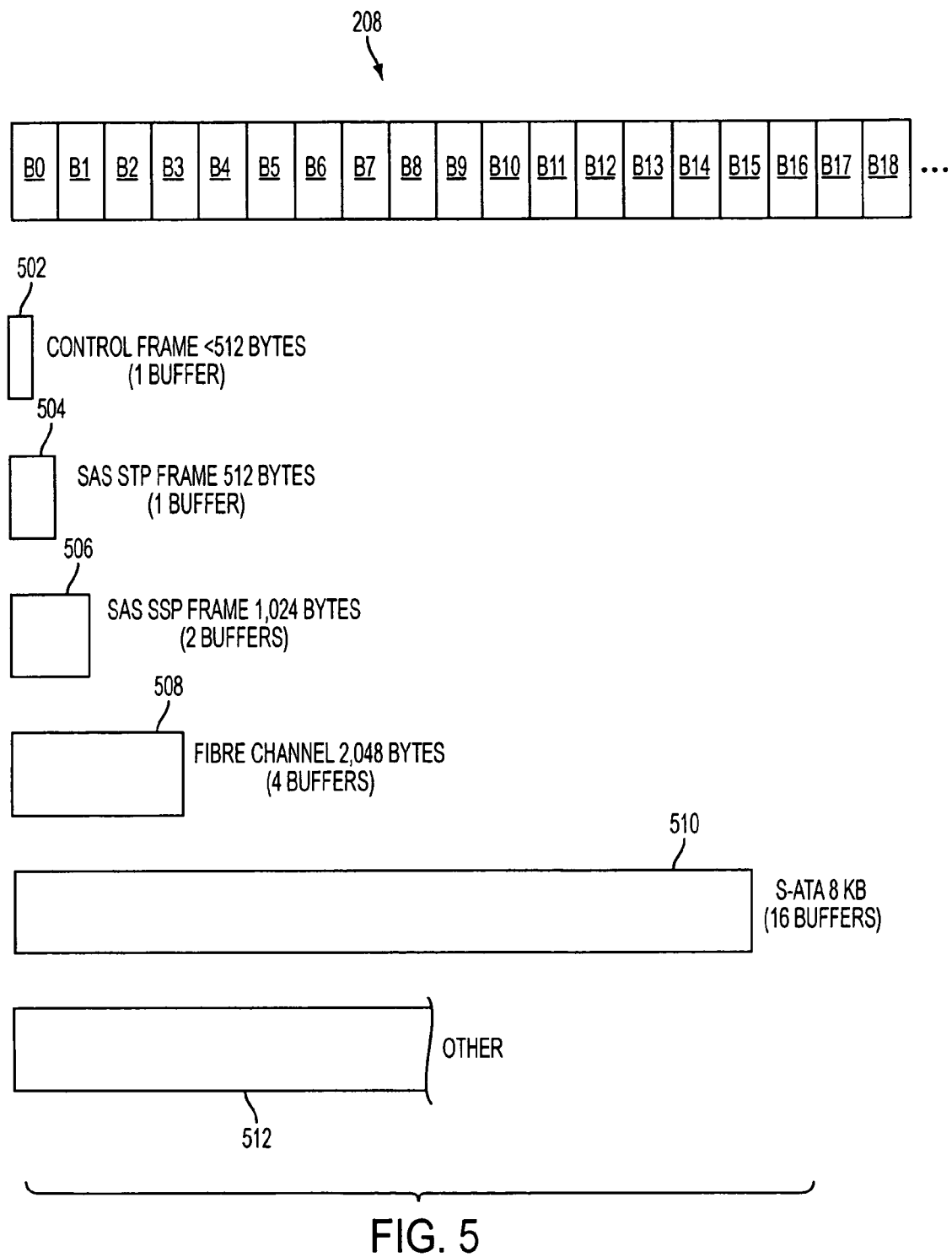
FIG. 5 is a block diagram illustrating an example of a relative size of the plurality of buffers compared to various frames compliant with a plurality of different communication protocols.

FIG. 5 illustrates relative frame sizes for various communication protocols compared to a plurality of buffers B0 through B18 of the transceiver buffer 208 each having a size of 512 bytes to illustrate how such a buffer arrangement may be utilized in a multi-protocol system. The smaller sized frame 502 may be a command, control, or status frame including such command, control, and status information and may be compliant with any of a plurality of communication protocols. The entirety of the smaller sized frame 502 may be stored within one buffer (Buffer B0) with relatively little wasted space in the buffer. Another frame 504 compliant with Serial Advanced Technology Attachment (ATA) Tunneled Protocol (STP) may have a maximum size of about 512 bytes and may also be stored within one buffer (B0) with no wasted space. Another larger sized frame 506 compliant with SAS Serial Small Computer System Interface (SCSI) Protocol (SSP) may have a maximum size of about 1,024 bytes and may require two buffers (B0 and B1) to store such a frame.

Yet another larger sized frame 508 compliant with Fibre Channel may have a maximum size of about 2,112 or 2,048 bytes and may require four or five buffers (B0-B4/B5) to store such a frame. Yet another larger sized frame 510 compliant with S-ATA may have a maximum size of about 8 kilobytes (KB) and may require sixteen buffers (B0-B15) to store such a frame. Other frames 512 compliant with other protocols, e.g., iSCSI, may require a certain number of buffers depending on the size of the frame.

The plurality of buffers in the transceiver buffer 208 may each have the same predetermined size, e.g., 512 bytes in the example of FIG. 5. This may be used to simply buffer utilization and management for multiple protocol systems that are capable of communicating using a plurality of different communication protocols such as SAS, Fibre Channel, S-ATA, and others. Rather than have a separate larger buffer for each communication protocol of the multi-protocol system and an associated protocol memory management unit to manage the different buffer sizes, only one sized buffer may be utilized and a plurality of such buffers (e.g., B0-B18) may be linked together to form the aggregate capacity necessary for the maximum sized frame of the selected communication protocol.

For those communication protocols that send receive credits such as SAS and FC, a predetermined number of the buffers may be reserved before sending a receive credit. The number of reserved buffers may vary by communication protocol. For example, in the example of FIG. 5, two buffers may be reserved for SAS, SSP, and four buffers may be reserved for FC. If the actual frame received requires less than the reserved plurality of buffers, than the excess reserved buffer(s) may be immediately released especially if the received frame requires firmware processing.

For those communication protocols that do not send receive credits, such as S-ATA, available buffers may be utilized to accept an incoming frame under control of the buffer control circuitry 206. The buffer control circuitry 206 may direct data to available buffers and fill as many buffers as necessary to accommodate the frame. The buffer control circuitry 206 may continue to direct data to the next available buffer, e.g., in a daisy chain of buffers 208-1, 208-2 . . . 208-n, until the receive buffer 208 reaches a high threshold level. If the high threshold level is not reached, the buffer control circuitry 206 may instruct the link layer circuitry 214 to send a reception in progress type primitive to allow receipt of additional data, e.g., in S-ATA this may be "Reception in Progress" (R_IP) primitives.

However, the data in the receive buffer 208 may reach the high threshold level. This may be caused by lack of available data space in memory 210 to accept data from the transceiver buffer 208 and/or lack of remaining capacity in the plurality of buffers 208-1, 208-2 . . . 208-n. Once the data level in the transceiver buffer 208 reaches the high threshold level, the buffer control circuitry 206 may inform the link layer circuitry 214 in the protocol engine circuitry 150a to send a hold type command to inform the remote node transmitting data to hold transmission of additional data. In S-ATA, such hold type command may be the HOLD primitive. The remote node transmitting data may be any variety of devices capable of transmitting data such as the intermediate devices 180, 182, mass storage 104, and/or the HBA 120.

Figure 6:
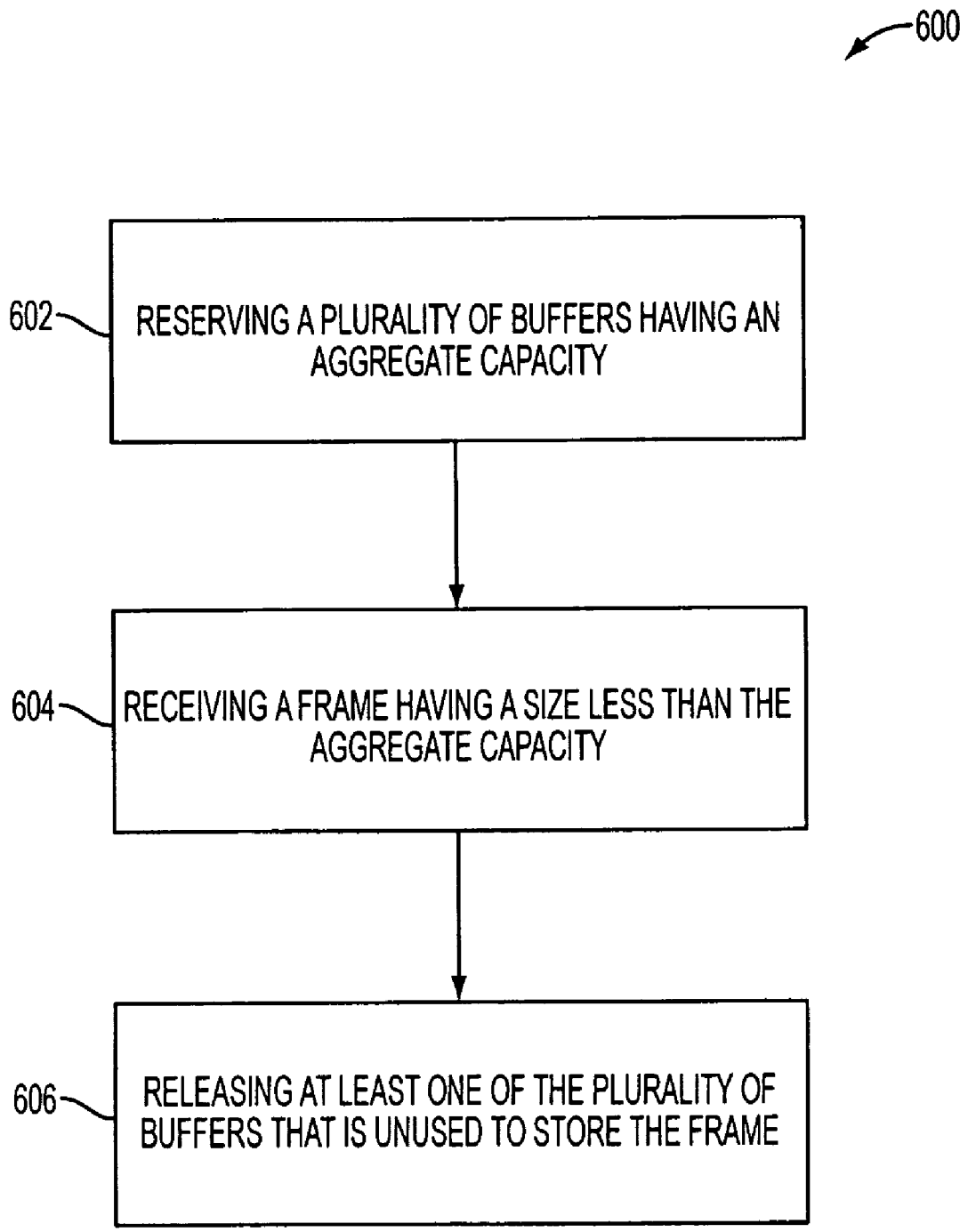
FIG. 6 is a flow chart illustrating operations according to an embodiment.

FIG. 6 is a flow chart of exemplary operation 600 consistent with an embodiment. Operation 602 may include reserving a plurality of buffers having an aggregate capacity. Operation 604 may include receiving a frame having a size less than the aggregate capacity. Finally, operation 606 may include releasing at least one of the plurality of buffers that is unused to store the frame.

It will be appreciated that the functionality described for all the embodiments described herein may be implemented using hardware, firmware, software, or a combination thereof.

Thus, in summary, one embodiment may comprise an apparatus. The apparatus may comprise an integrated circuit that is capable of reserving a plurality of buffers having an aggregate capacity. The integrated circuit may further be capable of receiving a frame having a size less than the aggregate capacity. Finally, the integrated circuit may further be capable of releasing at least one of the plurality of buffers that is unused to store the frame.

Another embodiment may comprise an article. The article may comprise a storage medium having stored thereon instructions that when executed by a machine result in the following: reserving a plurality of buffers having an aggregate capacity; receiving a frame having a size less than the aggregate capacity; and releasing at least one of the plurality of buffers that is unused to store the frame. An exemplary machine to execute instructions may, in one embodiment, be processor circuitry 212 or the IC 140.

A system embodiment may comprise a circuit card comprising an integrated circuit. The circuit card may be capable of being coupled to a bus. The integrated circuit may be capable of reserving a plurality of buffers having an aggregate capacity. The integrated circuit may further be capable of receiving a frame having a size less than the aggregate capacity. Finally, the integrated circuit may further be capable of releasing at least one of the plurality of buffers that is unused to store the frame.

Advantageously, in these embodiments, the plurality of buffers in the transceiver buffer 208 may be more efficiently utilized by a variety of sized frames. The frames may include smaller sized frames, e.g., frames containing control data. The size of the plurality of buffers may be small enough, e.g., 512 bytes in one embodiment, that a plurality of the buffers are needed to store a maximum sized frame for a particular communication protocol. Compared to a conventional embodiment with a single buffer size equal to the maximum size of a particular frame, there is much less wasted space in the transceiver buffer and hence efficiency of buffer utilization is improved.

In addition, for those communication protocols that reserve buffer space and send a receive credit before receipt of the actual frame, latency can be improved by releasing one or more buffers not needed to store the inbound frame. Hence, the released buffers are now free for other uses, e.g., to accept additional frames, and an associated improvement in latency may be realized. For example, assume four buffers are reserved to send one receive credit. Sixteen buffers (four sets of four) would then be reserved to send four receive credits. If four smaller sized control frames are received and each control frame needs only one of the four buffers reserved, three buffers for each set of four buffers could be immediately released. This would then result in twelve (three buffers per each set of four) available buffers that could be utilized to send an additional three receive credits. These three additional receive credits could be sent while the four inbound frames are being processed. Conventional embodiments that use four larger sized buffers would have all four large sized buffers locked up while processing of the four inbound frames took place. Hence, corresponding improvements in latency may be achieved.

Such a transceiver buffer 208 having plurality of buffers each with a predetermined size may also be utilized to simply buffer utilization and management for multiple protocol systems that are capable of communication using a plurality of different communication protocols such as SAS, Fibre Channel, S-ATA, and others. Rather than have a separate larger buffer for each communication protocol of the multi-protocol system and an associated protocol memory management unit to manage the different buffer sizes, a plurality of buffers from the transceiver buffer 208 may be linked together to form the aggregate capacity necessary for the maximum sized frame of the particular communication protocol. Each communication protocol engine circuitry may utilize the same transceiver buffer 208 and have access to the same available buffer pool list 310 of the buffer 208. Hence, buffer utilization may be optimized for such multiple protocol systems.

Furthermore, such a transceiver buffer 208 having plurality of buffers each with a predetermined size may also be useful in a bridge converting a frame compliant with a first protocol to a frame compliant with a second protocol as both the transmitting and receiving circuitry may have access to the same transceiver buffer 208 and available buffer pool list within the buffer 208. Such a bridge may include a FC/iSCSi to S-ATA bridge, a FC/iSCSi to SAS bridge, etc.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
   reserving a plurality of buffers having an aggregate capacity, said plurality of buffers are reserved based on, at least in part, a selected communication protocol, and said aggregate capacity capable of storing a maximum sized frame of said selected communication protocol;
   receiving a frame having a size less than said aggregate capacity;
   releasing at least one of said plurality of buffers that is unused to store said frame; and
   sending a receive credit in response to said reserving of said plurality of buffers, wherein said selected communication protocol comprises one of a Serial Attached Small Computer Systems Interface (SAS) communication protocol and a Fibre Channel (FC) communication protocol.

2. The method of claim 1, wherein said plurality of buffers reserved are selected from an available buffer pool of a transceiver buffer, and said releasing operation releases said at least one of said plurality of buffers back to said available buffer pool.

3. The method of claim 2, further comprising storing an outbound frame for transmission utilizing a minimum number of available buffers from said available buffer pool as necessary to hold an entirety of said outbound frame.

4. The method of claim 1, wherein said releasing of said at least one of said plurality of buffers occurs during frame processing of said frame.

5. The method of claim 1, wherein each of said plurality of buffers has a predetermined size, said predetermined size less than or equal to 512 bytes.

6. An apparatus comprising:
   an integrated circuit that is capable of reserving a plurality of buffers having an aggregate capacity, said integrated circuit further capable of receiving a frame having a size less than said aggregate capacity, and said integrated circuit further capable of releasing at least one of said plurality of buffers that is unused to store said frame, said integrated circuit is further capable of reserving said plurality of buffers based on, at least in part, a selected communication protocol, wherein said aggregate capacity is capable of storing a maximum sized frame of said selected communication protocol, said integrated circuit is further capable of sending a receive credit in response to said reserving of said plurality of buffers, and wherein said selected communication protocol comprises one of a Serial Attached Small Computer Systems Interface (SAS) communication protocol and a Fibre Channel (FC) communication protocol.

7. The apparatus of claim 6, wherein said wherein said plurality of buffers reserved are selected from an available buffer pool of a transceiver buffer, and said integrated circuit is further capable of releasing said at least one of said plurality of buffers back to said available buffer pool.

8. The apparatus of claim 7, wherein said integrated is also capable of storing an outbound frame for transmission utilizing a minimum number of available buffers from said available buffer pool as necessary to hold an entirety of said outbound frame.

9. The apparatus of claim 6, wherein said integrated circuit is also capable of said releasing of said at least one of said plurality of buffers while said integrated circuit processes said frame.

10. The apparatus of claim 6, wherein each of said plurality of buffers has a predetermined size, said predetermined size less than or equal to 512 bytes.

11. An article comprising:
    a storage medium having stored thereon instructions that when executed by a machine results in the following:
    reserving a plurality of buffers having an aggregate capacity, said plurality of buffers being reserved based on, at least in part, a selected communication protocol, and wherein said aggregate capacity is capable of storing a maximum sized frame of said selected communication protocol;
    receiving a frame having a size less than said aggregate capacity;
    releasing at least one of said plurality of buffers that is unused to store said frame; and sending a receive credit in response to said reserving of said plurality of buffers, and wherein said selected communication protocol comprises one of a Serial Attached Small Computer Systems Interface (SAS) communication protocol and a Fibre Channel (FC) communication protocol.

12. The article of claim 11, wherein said plurality of buffers reserved are selected from an available buffer pool of a transceiver buffer, and said releasing operation releases said at least one of said plurality of buffers back to said available buffer pool.

13. The article of claim 12, further comprising storing an outbound frame for transmission utilizing a minimum number of available buffers from said available buffer pool as necessary to hold an entirety of said outbound frame.

14. The article of claim 11, wherein said releasing of said at least one of said plurality of buffers occurs during frame processing of said frame.

15. The article of claim 11, wherein each of said plurality of buffers has a predetermined size, said predetermined size less than or equal to 512 bytes.

16. A system comprising:
a circuit card comprising an integrated circuit, said circuit card capable of being coupled to a bus, said integrated circuit being capable of reserving a plurality of buffers having an aggregate capacity, said plurality of buffers being reserved based on, at least in part, a selected communication protocol, and wherein said aggregate capacity is capable of storing a maximum sized frame of said selected communication protocol, said integrated circuit further capable of receiving a frame having a size less than said aggregate capacity, and said integrated circuit further capable of releasing at least one of said plurality of buffers that is unused to store said frame, said integrated circuit is further capable of sending a receive credit in response to said reserving of said plurality of buffers, and wherein said selected communication protocol comprises one of a Serial Attached Small Computer Systems Interface (SAS) communication protocol and a Fibre Channel (FC) communication protocol.

17. The system of claim 16, further comprising a circuit board comprising said bus and a bus interface slot, said circuit card capable of being coupled to said bus interface slot.

18. The system of claim 16, wherein said plurality of buffers reserved are selected from an available buffer pool of a transceiver buffer, and said integrated circuit is further capable of releasing said at least one of said plurality of buffers back to said available buffer pool.

19. The system of claim 18, wherein said integrated circuit is also capable of said releasing of said at least one of said plurality of buffers back to said available buffer pool while said integrated circuit processes said frame.

* * * * *